United States Patent
Spencer et al.

(10) Patent No.: US 11,047,215 B2
(45) Date of Patent: Jun. 29, 2021

(54) DRILLING OPERATION SIMULATION SYSTEM AND RELATED METHODS

(71) Applicant: Baker Hughes Holdings LLC, Houston, TX (US)

(72) Inventors: Reed W. Spencer, Spring, TX (US); Jayesh Rameshlal Jain, The Woodlands, TX (US); Ethan Thomas Walkowiak, New Kensington, PA (US); Chaitanya K. Vempati, Conroe, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 453 days.

(21) Appl. No.: 15/921,914

(22) Filed: Mar. 15, 2018

(65) Prior Publication Data

US 2019/0284909 A1 Sep. 19, 2019

(51) Int. Cl.
*E21B 41/00* (2006.01)
*G06N 5/04* (2006.01)
(Continued)

(52) U.S. Cl.
CPC ............ *E21B 41/0092* (2013.01); *E21B 7/04* (2013.01); *E21B 45/00* (2013.01); *E21B 49/00* (2013.01);
(Continued)

(58) Field of Classification Search
CPC ........ E21B 41/0092; E21B 45/00; E21B 7/04; E21B 49/00; E21B 44/00; E21B 2200/20;
(Continued)

(56) References Cited

U.S. PATENT DOCUMENTS 5,220,963 A 6/1993 Patton
7,604,072 B2 10/2009 Pastusek et al.
(Continued)

FOREIGN PATENT DOCUMENTS

WO 2015/057099 A1 4/2015

OTHER PUBLICATIONS

Caicedo, Hector et al., "Unique Bit Performance Predictor using Specific Energy Coefficients as a Function of Confined Compressive Strength Impacts Drilling Performance", Jan. 2005, 18th World Petroleum Congress, World Petroleum Congress. (Year: 2005).*
(Continued)

*Primary Examiner* — Cedric Johnson
(74) *Attorney, Agent, or Firm* — TraskBritt

(57) ABSTRACT

A simulation system that receives a first plurality of inputs including at least one drilling parameter, at least one lithology parameter, and at least one earth-boring tool option; provides the first plurality of inputs to a cluster system; receives simulation data from the cluster system derived from a plurality of simulations of drilling operations utilizing the first plurality of inputs; analyzes the simulation data to generate a predictive algorithm for simulating drilling operations; receives a well plan including data related to a planned trajectory of a borehole; and utilizes the predictive algorithm to select a suitable earth-boring tool and suitable drilling parameters to achieve the planned trajectory of a borehole.

20 Claims, 5 Drawing Sheets

(51) Int. Cl.
*E21B 45/00* (2006.01)
*E21B 7/04* (2006.01)
*E21B 49/00* (2006.01)
*G06N 20/00* (2019.01)
*G06F 30/20* (2020.01)
*E21B 44/00* (2006.01)
*G06F 111/10* (2020.01)

(52) U.S. Cl.
CPC .............. *G06F 30/20* (2020.01); *G06N 5/04* (2013.01); *G06N 20/00* (2019.01); *E21B 44/00* (2013.01); *E21B 2200/20* (2020.05); *G06F 2111/10* (2020.01)

(58) Field of Classification Search
CPC ...... G06F 30/20; G06F 30/00; G06F 2111/10; G06F 17/5009; G06F 2217/16; G06N 20/00; G06N 5/04; G06N 20/10; G06N 5/003; G06N 3/08; G06N 5/025; G06N 20/20
USPC ...................................................... 703/10, 6
See application file for complete search history.

(56) References Cited

U.S. PATENT DOCUMENTS

| | | |
|---|---|---|
| 7,849,934 B2 | 12/2010 | Pastusek et al. |
| 8,100,196 B2 | 1/2012 | Pastusek et al. |
| 2010/0155142 A1* | 6/2010 | Thambynayagam ... E21B 44/00 175/61 |
| 2011/0088949 A1 | 7/2011 | Zuo et al. |
| 2015/0142406 A1* | 5/2015 | Spencer .................... E21B 7/04 703/10 |
| 2015/0167392 A1 | 6/2015 | Sugiua |
| 2016/0265334 A1* | 9/2016 | Dykstra .............. E21B 41/0092 |
| 2016/0327680 A1* | 11/2016 | Jain ........................ G01V 5/101 |
| 2017/0058658 A1 | 3/2017 | Spencer et al. |
| 2018/0075544 A1 | 3/2018 | Passolt et al. |

OTHER PUBLICATIONS

Bjornsson, E. et al., "Drilling Optimization Using Bit Selection Expert System and ROP Prediction Algorithm Improves Drilling Performance and Enhances Operational Decision Making by Reducing Performance Uncertainties", Sep. 26-29, 2004, SPE Annual Technical Conference and Exhibition. (Year: 2004).*
International Search Report for International Application No. PCT/US2019/022437 dated Jun. 27, 2019, 3 pages.
International Written Opinion for International Application No. PCT/US2019/022437 dated Jun. 27, 2019, 7 pages.

\* cited by examiner

| Parameter Estimates | | | | |
|---|---|---|---|---|
| Term | Estimate | Std Error | t Ratio | Prob>|t| |
| Intercept | 14.13743 | 1.094508 | 12.92 | <.0001* |
| DEPTH | -0.000209 | 5.729e-5 | -3.64 | 0.0008* |
| UCS | -0.000311 | 6.821e-5 | -4.56 | <.0001* |
| GAGE LENGTH | -2.12756 | 0.095491 | -22.28 | <.0001* |
| GAGE UNDERSIZE | 92.753158 | 4.774553 | 19.43 | <.0001* |
| ROP | -0.023391 | 0.004775 | -4.90 | <.0001* |
| (GAGE LENGTH-3.5)*(GAGE UNDERSIZE-0.06) | -24.73361 | 3.280998 | -7.54 | <.0001* |
| INC | 0.0083431 | 0.003183 | 2.62 | 0.0126* |
| (GAGE LENGTH-3.5)*(GAGE LENGTH-3.5) | 0.7373622 | 0.124641 | 5.92 | <.0001* |

DRILLING OPERATION SIMULATION SYSTEM AND RELATED METHODS

TECHNICAL FIELD

This disclosure relates generally to drilling operation simulation systems, determining predictive drilling operation equations, and methods of using drilling operation simulation systems.

BACKGROUND

Oil wells (wellbores) are usually drilled with a drill string. The drill string includes a tubular member having a drilling assembly that includes a single drill bit at its bottom end. The drilling assembly may also include devices and sensors that provide information pertaining to a variety of parameters relating to the drilling operations ("drilling parameters"), behavior of the drilling assembly ("drilling assembly parameters") and parameters relating to the formations penetrated by the wellbore ("formation parameters"). A drill bit and/or reamer attached to the bottom end of the drilling assembly is rotated by rotating the drill string from the drilling rig and/or by a drilling motor (also referred to as a "mud motor") in the bottom-hole assembly ("BHA") to remove formation material to drill the wellbore.

Typically, simulations of drilling operations are generated in order to assist in selected earth-boring tools and drilling parameters for the drilling operations. The simulations are calculation heavy and require a significant amount of operator time and computer processing power. In some instances, the computer processing power and time required is prohibitive such that operators are extremely limited in the number of simulations that the operators can generate prior to commencing a drilling operation.

BRIEF SUMMARY

Some embodiments of the present disclosure include methods of generating simulations of drilling operations and generating predictive equations for simulating drilling operations. The method may include receiving a first plurality of inputs including at least one drilling parameter, at least one lithology parameter, and at least one earth-boring tool option; providing the first plurality of inputs to a cluster system; receiving simulation data from the cluster system derived from a plurality of simulations of drilling operations utilizing the first plurality of inputs; analyzing the simulation data to generate a predictive algorithm for simulating drilling operations; receiving a well plan including data related to a planned trajectory of a borehole; and utilizing the predictive algorithm to select a suitable earth-boring tool and suitable drilling parameters to achieve the planned trajectory of a borehole.

In additional embodiments, the present disclosure includes simulation systems. The simulation systems may include at least one processor and at least one non-transitory computer-readable storage medium storing instructions thereon that, when executed by the at least one processor, cause the system to: receive a first plurality of inputs including at least one drilling parameter, at least one lithology parameter, and at least one earth-boring tool option; provide the first plurality of inputs to a cluster system; receive simulation data from the cluster system derived from a plurality of simulations of drilling operations utilizing the first plurality of inputs; analyze the simulation data to generate a predictive algorithm for simulating drilling operations; receive a well plan including data related to a planned trajectory of a borehole; and utilize the predictive algorithm to select a suitable earth-boring tool and suitable drilling parameters to achieve the planned trajectory of a borehole.

Some embodiments of the present disclosure include a non-transitory computer readable medium storing instructions thereon that, when executed by at least one processor, cause the at least one processor to perform steps comprising: receive a first plurality of inputs including at least one drilling parameter, at least one lithology parameter, and at least one earth-boring tool option; provide the first plurality of inputs to a cluster system; receive simulation data from the cluster system derived from a plurality of simulations of drilling operations utilizing the first plurality of inputs; analyze the simulation data to generate a predictive algorithm for simulating drilling operations; receive a well plan including data related to a planned trajectory of a borehole; utilize the predictive algorithm to select a suitable earth-boring tool and suitable drilling parameters to achieve the planned trajectory of a borehole; and utilizing the predictive algorithm to generate simulations of a drilling operation using a second plurality of inputs that are at least partially different from the first plurality of inputs and without performing any additional simulations with the cluster system.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
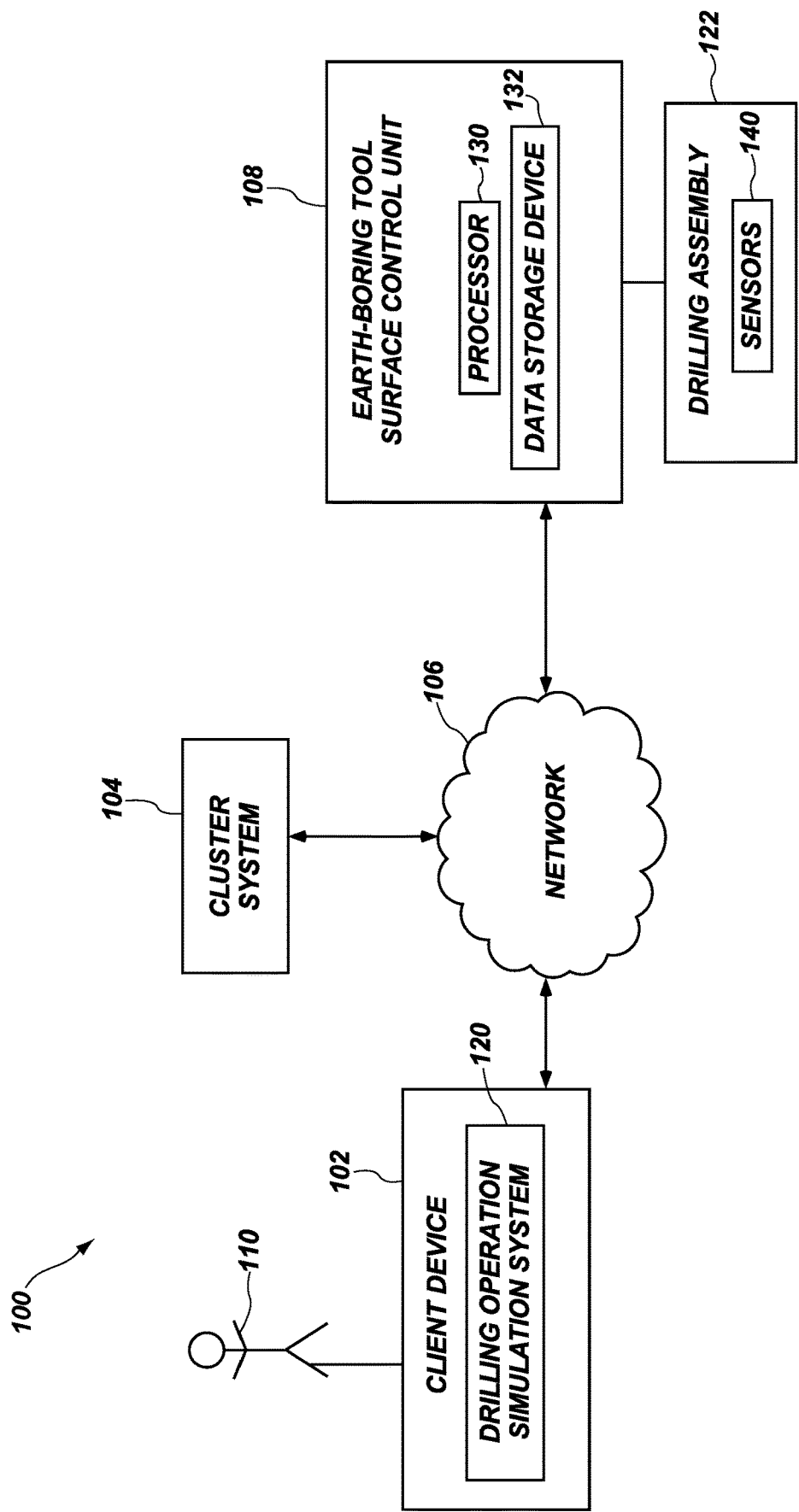
FIG. 1 illustrates a schematic diagram of an example communication system in which a drilling operation simulation system can operate in accordance with one or more embodiments of the present disclosure.

The illustrations presented herein are not actual views of any drilling system, earth-boring tool monitoring system, or any component thereof, but are merely idealized representations, which are employed to describe embodiments of the present invention.

As used herein, the terms "bit" and "earth-boring tool" each mean and include earth-boring tools for forming, enlarging, or forming and enlarging a borehole. Non-limiting examples of bits include fixed-cutter ("drag") bits, fixed-cutter coring bits, fixed-cutter eccentric bits, fixed cutter bi-center bits, fixed-cutter reamers, expandable reamers with blades bearing fixed cutters, and hybrid bits including both fixed cutters and rotatable cutting structures (roller cones).

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," etc., is used for clarity and convenience in understanding the disclosure and accompanying drawings, and does not connote or depend on any specific preference or order, except where the context clearly indicates otherwise. For example, these terms may refer to an orientation of elements of an earth-boring tool when disposed within a borehole in a conventional manner. Furthermore, these terms may refer to an orientation of elements of an earth-boring tool when disposed as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "hole quality" may refer to a consistency of a diameter of the hole, a level at which the hole matches a desired trajectory, a shape of the hole, an amount of damage to a sidewall of the hole, etc.

Some embodiments of the present disclosure include a drilling operation simulation system. The drilling operation simulation system may interface with a cluster system and/or a drilling rig surface control unit to perform direction drill ahead simulations ("DDAS") and to determine (e.g., generate) a predictive algorithm based on the DDAS simulations. The predictive algorithm may be utilized by the simulation system to generate simulations of drilling operations and to predict trajectories of drilling operations (e.g., directional drilling operations). Furthermore, utilizing the predictive algorithm, the simulation system may optimize a selection process of selecting an earth-boring tool (e.g., drill bit) and drilling parameters for a given formation and desired trajectory to achieve a desired borehole quality and trajectory. Additionally, upon selecting an earth-boring tool and drilling parameters, the simulation system may provide interactive graphical user interfaces ("GUIs") (e.g., graphs, tables, and/or plots) that represent simulated drilling operations with the selected earth-boring tool and the associated drilling parameters.

FIG. 1 illustrates a schematic diagram of an example communication system 100 in which a drilling operation simulation system 120 can operate in accordance with one or more embodiments. As illustrated, the communication system 100 includes a client device 102, a cluster system 104, an earth-boring tool surface control unit 108 (hereinafter "surface control unit"), and a network 106. The client device 102, the cluster system 104, and the surface control unit 108 may communicate via the network 106. The network 106 can include one or more networks, such as the Internet, and can use one or more communications platforms or technologies suitable for transmitting data and/or communication signals. Although FIG. 1 illustrates a particular arrangement of the client device 102, the cluster system 104, the surface control unit 108, and the network 106, various additional arrangements are possible. For example, the surface control unit 108 can directly communicate with the client device 102, bypassing the network 106. In alternative embodiments, the communication system 100 does not include the surface control unit 108 and/or the network 106. Rather, the cluster system 104 can directly communicate with the client device 102. In particular, the surface control unit 108 and the network 106 are not required in every embodiment of the present disclosure.

As shown in FIG. 1, in some embodiments, the client device 102 may include the drilling operation simulation system 120 (hereinafter "simulation system") installed thereon. As is described in greater detail below, the simulation system 120 may interface with the cluster system 104 and/or the surface control unit 108 to perform direction drill ahead simulations ("DDAS") and to determine (e.g., generate) a predictive algorithm based on the DDAS simulations that can be utilized to perform additional simulations of drilling operations. Furthermore, utilizing the predictive algorithm, the simulation system 120 may optimize selecting an earth-boring tool (e.g., drill bit) and drilling parameters for a given formation and desired trajectory to achieve a desired borehole quality and trajectory. Additionally, upon selecting an earth-boring tool and drilling parameters, the simulation system 120 may provide interactive graphical user interfaces ("GUIs") (e.g., graphs, tables, and/or plots) that represent simulated drilling operations with the selected earth-boring tool and the associated drilling parameters. Although the simulation system 120 is described herein as being part of the client device 102, the disclosure is not so limited. Rather, as will be understood by one of ordinary skill in the art, the simulation system 120 may, in alternative embodiments, be part of the cluster system 104 and/or the surface control unit 108. The simulation system 120 is described in greater detail in regard to FIGS. 2-5.

Referring still to FIG. 1, a user 110 can interface with the client device 102, for example, to utilize the simulation system 120 to simulate drilling operations and determine predictive algorithms. The user 110 can be an individual (i.e., a human user), a business, a group, or any other entity. For instance, the user 110 can be an operator and/or engineer of an earth-boring tool and/or drilling operation. Although FIG. 1 illustrates only one user 110 associated with the client device 102, the communication system 100 can include any number of a plurality of users that each interact with the simulation system 120 using a corresponding client device 102.

In some embodiments, the simulation system 120 of the client device 102 includes a simulation application installed thereon. The simulation application may be associated with the simulation system 120. For example, the simulation application enables the user 110 to interact with the simulation system 120, to provide drilling operation inputs (e.g., lithology and drilling parameters) to the simulation system 120, to run DDAS simulations, utilize a predictive algorithm, view data resulting from simulations, etc.

Referring still to FIG. 1, the surface control unit 108 may be placed at a surface of a drilling rig for receiving and processing downhole data transmitted by sensors 140 in a drill bit and/or sensors 140 in a drilling assembly 122, and for controlling selected operations of the various devices and sensors 140 in the drilling assembly 122. The sensors 140 may include one or more of sensors 140 that determine build-up-rate, turn rate, acceleration, weight on bit, torque, pressure, rate of penetration ("ROP"), lateral ROP, contact forces, rib forces, inclination, azimuth, formation lithology, etc. In some embodiments, the surface control unit 108 may receive downhole data from any of the sensors described in, for example, in U.S. Pat. No. 8,100,196, to Pastusek et al., filed Feb. 6, 2009, issued Jan. 24, 2012, U.S. Pat. No. 7,849,934, to Pastusek et al., filed Feb. 16, 2007, issued Dec. 14, 2010, and U.S. Pat. No. 7,604,072, to Pastusek et al., filed Jun. 7, 2005, issued Oct. 20, 2009, the disclosures of which are incorporated in their entireties by this reference herein.

In some embodiments, the surface control unit 108 may include a processor 130 and a data storage device 132 (or a computer-readable medium) for storing data, algorithms, and computer programs. The data storage device 132 may be any suitable device, including, but not limited to, a Read-Only Memory (ROM), a Random-Access Memory (RAM), a Flash memory, a magnetic tape, a hard disk, and an optical disk. Additionally, the surface control unit 108 may further include one or more devices for presenting output to an operator of the drilling assembly 122, including, but not limited to, a graphics engine, a display (e.g., a display screen), one or more output drivers (e.g., display drivers), one or more audio speakers, and one or more audio drivers. In certain embodiments, the surface control unit 108 is configured to provide graphical data to a display for presentation to the operator. The graphical data may be representative of one or more graphical user interfaces and/or any other graphical content as may serve a particular implementation.

Both the client device 102 and the surface control unit 108 may represent various types of computing devices with which users can interact. For example, the client device 102 and/or the surface control unit 108 can be a mobile device (e.g., a cell phone, a smartphone, a PDA, a tablet, a laptop, a watch, a wearable device, etc.). In some embodiments, however, the client device 102 and/or surface control unit 108 can be a non-mobile device (e.g., a desktop or server). Additional details with respect to the client device 102 and the surface control unit 108 are discussed below with respect to FIG. 5.

The cluster system 104 may include a plurality of connected (loosely or tightly) computers that work together such that the plurality of connected computers can be considered a single system. For instance, each computer of the plurality of computers may have a respective node that is set to perform a common task with the other computers of the plurality of computers. The cluster system 104 may be at least partially controlled and/or scheduled by software (e.g., portions of the simulation system 120). Furthermore, in additional embodiments, cluster system 104 may be a cloud system. For instance, the cluster system 104 may include software and services operated on the Internet.

In some embodiments, the plurality of computers of the cluster system 104 may be connected through relatively fast local area networks, with each node (computer used as a server) running its own instance of an operating system. For example, in one or more embodiments, all of the nodes may use the same hardware configuration and the same operating system. In alternative embodiments, the plurality of computers may utilize differing operating systems and/or different hardware (e.g., Open Source Cluster Application Resources (OSCAR)).

As will be understood by one of ordinary skill in the art, the cluster system 104 improves performance and availability over that of a single computer and is much more cost-effective than single computers of comparable speed or availability. In view of the foregoing, the communication system 100 may include any cluster system 104 known in the art.

Figure 2:
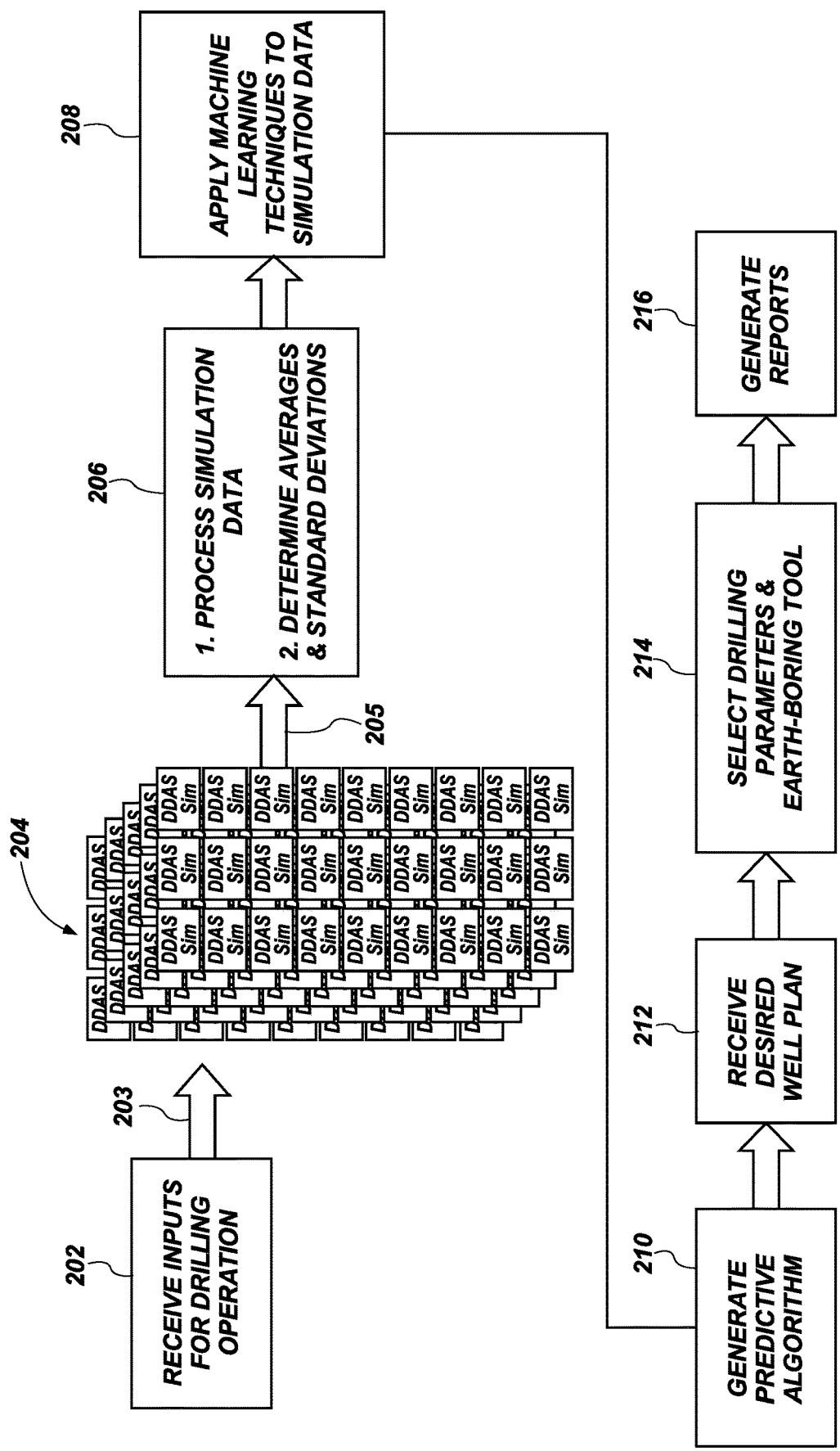
FIG. 2 shows example processes of the simulation system via a schematic-flow diagram according to one or more embodiments of the present disclosure.

FIG. 2 shows example processes of the simulation system 120 via a schematic-flow diagram. For instance, FIG. 2 shows one or more embodiments of a sequence-flow that the simulation system 120 utilizes to generate unique predictive algorithms for given lithology parameters, drilling parameters, and earth-boring tool options and to select a best earth-boring tool option and best drilling parameters to achieve a well plan (e.g., trajectory, hole quality, BUR, etc.).

As shown in FIG. 2, the simulation system 120 may receive inputs for a drilling operation, as shown in act 202. For instance, the simulation system 120 may receive inputs for a drilling operation via the simulation application of the simulation system 120. In some embodiments, a user 110 may define a drilling operation (e.g., a problem and/or space design) within the simulation application of the simulation system 120. For example, the user 110 may define the drilling operation by defining drilling parameters, lithology parameters, and earth-boring tool options.

In one or more embodiments, the drilling parameters may include a desired and/or ranges of depth, turn rates, acceleration, WOB, pressure, rate of penetrations, lateral rate of penetrations, inclinations, azimuth, borehole trajectories, hole qualities, etc. In some embodiments, the lithology parameters may include rock types, rock strengths, grain/clast sizes, mineralogy, fabric, chemical properties, compositions, porosity, permeability, and/or texture of a subterranean formation to be drilled. The earth-boring tool options may include bit diameters, gage lengths, cutting element positions, earth-boring tool types (e.g., hybrid bits, tri-cone bits, fixed-blade bits), bottom-hole assembly ("BHA") options, etc. As a non-limiting example, the input drilling parameters, lithology parameters, and earth-boring tool options may include any of the parameters and earth-boring tool options described in U.S. patent application Ser. No. 14/517,433, to Spencer et al., filed Oct. 17, 2014, the disclosure of which is incorporated in its entirety by reference herein. Additionally, the input drilling parameters, lithology parameters, and earth-boring tool options may include gamma ray levels, acoustic measurements, resistivity measurements, torque, rib force, lateral bit force, etc.

In response to receiving the input drilling parameters, lithology parameters, and/or earth-boring tool options, the simulation system 120 provides the input drilling parameters, lithology parameters, and/or earth-boring tool options to the cluster system 104, as shown in act 203 of FIG. 2. For instance, the simulation system 120 may provide the input drilling parameters, lithology parameters, and/or earth-boring tool options to the cluster system 104 via the network 106.

Upon receiving the input drilling parameters, lithology parameters, and/or earth-boring tool options, the cluster system 104 performs a plurality of directional drill ahead simulations ("DDAS"), as shown in act 204 of FIG. 2. For instance, the cluster system 104 may perform hundreds, thousands, tens of thousands, hundreds of thousands, or any other number of DDAS simulations. As a non-limiting example, the cluster system 104 may perform the DDAS simulations via any of the manners described in in U.S. patent application Ser. No. 14/517,433, to Spencer et al., filed Oct. 17, 2014 and/or U.S. patent application Ser. No. 15/348,003, to Spencer et al., filed Nov. 10, 2016, the disclosures of which are incorporated in their entireties by reference herein.

For example, the cluster system 104 may perform each DDAS simulation by constructing a BHA model (e.g., computer model) of a given BHA. The constructed BHA model may include dimensions, geometry, mass distribution, material density, and material stiffness of the given BHA and dimensions and geometry of the borehole as predicted to be drilled. Furthermore, the cluster system 104 may determine (e.g., calculate) one or more points of contact between the BHA and a wall of the borehole and forces imposed on the BHA at the one or more contact points. The forces may include a side force vector imposed on the BHA. Moreover, the cluster system 104 may determine (e.g., calculate) a drill bit tilt of the BHA. The cluster system 104 may also determine a confined compressive strength of the rock formation by utilizing an axial motion drill bit model that uses the defined drilling parameters, lithology parameters, and earth-boring tool options. The cluster system 104 may further determine lateral motion of the drill bit using a lateral motion drill bit model that utilizes a calculated confined compressive strength, the lithology parameters, the earth-boring tool options, and the drill bit side force vector and drill bit tilt from the BHA model; determine a ratio of lateral motion to axial motion using the lateral motion drill bit model; calculating an inclination angle and an azimuthal direction of the BHA using a BHA steering model that receives the ratio; and iterate the above steps by updating the BHA model to include extending the borehole an incremental distance in the direction of the inclination angle and the azimuthal direction and displacing the BHA the incremental distance in the extended borehole.

After the cluster system 104 has performed the plurality of DDAS simulations, the simulation system 120 receives simulation data related to (e.g., derived from) the plurality of DDAS simulations, as shown in act 205 of FIG. 2. For instance, the simulation system 120 may receive simulation data related to the plurality of DDAS simulations via the network 106 and from the cluster system 104. In some embodiments, the simulation data may include output variables of the DDAS. For example, the simulation data may include, for each simulation, output variables representing determined BUR, turn rates, ROP, lateral ROP, UCS, CCS, contact forces, rib forces, and any other directional drilling variables. As a non-limiting example, the simulation data may include any of the output variables described in U.S. patent application Ser. No. 14/517,433, to Spencer et al., filed Oct. 17, 2014 and/or U.S. patent application Ser. No. 15/348,003, to Spencer et al., filed Nov. 10, 2016.

Upon receiving the simulation data from the cluster system 104, the simulation system 120 analyzes the simulation data, as shown in act 206 of FIG. 2. For instance, the simulation system 120 may determine average values of output variables within the simulation data, standard deviations of the output variables, maximums and minimums of the output variables, quartiles, coefficients of variation, and other descriptive statistics of the output variables of the simulation data. In some embodiments, the cluster system 104 may analyze the simulation data and determine the foregoing descriptive statistics.

In addition to determining the descriptive statistics of the simulation data, the simulation system 120 may further analyze the simulation data to generate a predictive algorithm, as shown in act 210 of FIG. 2. For instance, the simulation system 120 may analyze the simulation data to determine a predictive algorithm for predicting output variables (i.e., BUR, turn rates, ROP, Lateral ROP, UCS, CCS, contact forces, rib forces, and any other directional drilling variables) given input variables (i.e., input drilling parameters, lithology parameters, and/or earth-boring tool options). For instance, the simulation system 120 may utilize the predictive algorithm to perform additional simulations of drilling operations unique to the input lithology parameters, drilling operations parameters, and earth-boring tool options. In some embodiments, the simulation system 120 may utilize one or more machine learning techniques, as shown in act 208 of FIG. 2, to analyze the simulation data and to generate the predictive algorithm.

In one or more embodiments, the machine learning techniques may include applying a regression analysis (e.g., a set of statistical processes for estimating the relationships among variables). Furthermore, as is known in the art, regression analysis may estimate conditional expectations of dependent variables (e.g., output variables) given independent variables (e.g., input variables). As a non-limiting example, the regression analysis may include a linear regression analysis. For instance, the simulation data may include one or more data sets $\{y_i, x_{i1}, \ldots, x_{ip}\}_{i=1}^{n}$ of n statistical units (i.e., the input and output variables of the DDAS). Furthermore, as will be understood by one of ordinary skill in the art, the linear regression model takes the following form:

$$y_i = \beta_0 1 + \beta_1 x_{i1} + \ldots + \beta_p x_{ip} + \varepsilon_i = x_i^T \beta + \varepsilon_i, i=1, \ldots, n,$$

where T represents the transpose. Moreover, as is known in the art, in a linear regression model, the output variables from the DDAS simulations (i.e., observations) are assumed to be the result of random deviations from an underlying relationship between (i.e., a predictive algorithm correlating) the dependent variables (y) and independent variables (x). In other words, the linear regression model may determine a relationship between the input parameters (i.e., input variables) described above and output variables from the from the DDAS simulations. As a result, via a regression analysis, the simulation system 120 generates a predictive algorithm (e.g., y=a+bx) that can be utilized to predict the output variables, and, as a result, generate simulations and trajectories of directional drilling operations. Moreover, as will be understood in the art, the predictive algorithm may be unique to the inputs of the DDAS simulations. The predictive algorithm is described in greater detail below in regard to FIGS. 3A and 3B.

Referring still to act 210 of FIG. 2, in alternative embodiments, the machine learning techniques may include a quadratic regression analysis, a logistic regression analysis, support vector machine, Gaussian process regression, ensemble methods, or any other regression analysis. Furthermore, in yet further embodiments, the machine learning techniques may include decision tree learning, regression trees, boosted trees, k-nearest neighbor, association rule learning, a neural network, deep learning, or any other type of machine learning. In yet further embodiments, the analysis may include a multivariate interpolation analysis.

Regardless of how the predictive algorithm is generated, upon generating the predictive algorithm, the simulation system 120 may receive a well plan (e.g., desired borehole trajectory plan), as shown in act 212 of FIG. 2. In some embodiments, an operator may input the well plan into the simulation system 120 via the client device 102 and/or simulation application. The well plan may include a desired (e.g., planned) trajectory, desired drilling traits (e.g., BUR, turn rates, ROP, lateral ROP, UCS, CCS, contact forces, rib forces, etc.), desired maximum tortuosity, and desired maximum deviation from well plan.

In response to receiving the well plan, the simulation system 120 utilizes the generated predictive algorithm to select an appropriate earth-boring tool and drilling parameters (e.g., WOB) to achieve the well plan (e.g., a desired borehole quality, the planned trajectory, and drilling traits (e.g., BUR)), as shown in act 214 of FIG. 2. For example, the simulation system 120 may determine which input variables achieve the desired output variables and which earth-boring tools and parameters achieve a trajectory associated with the desired output variables. In some embodiments, the simulation system 120 utilizes the generated predictive algorithm to select a best earth-boring tool option and best drilling parameters to best achieve the well plan. In other words, the simulation system 120 may optimize and automate selecting an earth-boring tool and drilling parameters to achieve a given well plan.

Additionally, once the predictive algorithm has been generated by the simulation system 120, the predictive algorithm may be utilized to perform simulations for given drilling parameters, lithology parameters, and/or earth-boring tool options without re-running DDAS simulations. For example, an operator can perform simulations using the predictive algorithm more quickly than when using conventional simulations systems. For instance, the predictive algorithm can cut required user time by between about 70% and 90%. Additionally, the predictive algorithm may enable the simulation system 120 to perform simulations of drilling operations utilizing input parameters not originally included within the DDAS simulations performed by the cluster system 104 without having to re-run all the simulations. As a non-limiting example, the DDAS simulations may have included earth-boring tool options having 3-inch and 5-inch gauges. However, with the predictive algorithm, results (i.e., output variables) of an earth-boring tool having a 4-inch gauge can be determined without running any new DDAS simulations.

In addition to utilizing the generated predictive algorithm to select appropriate earth-boring tools and drilling options parameters, the simulation system 120 may generate and provide reports with earth-boring tool proposals and interactive plots for display to a user 110 (e.g., operator) via the client device 102, as shown in act 216 of FIG. 2. For example, the simulation system 120 may generate and provide reports that include BUR, turn rate, walk rate, dog leg severity, WOB, CCS, contact forces, bending moments, or any of the other output variables described herein. Furthermore, the reports may include recommended earth-boring tools (e.g., bits), gauge configurations, and operating parameters.

Additionally, the simulation system 120 may generate interactive profiling plots and surface response plots. The profiling plots and surface response plots may show output variables of the predictive algorithm and may include one or more sliders representing the input variables of the predictive algorithm. The sliders may allow users (e.g., operators) to manipulate the slider values of the sliders (e.g., values of the input variables) and to visualize the effects of changing the input variables on the output variables. Furthermore, one or more of the sliders may include output variables not currently being plotted on the profiling plots and surface response plots. In some embodiments, output variables may be plotted on axes (i.e., an x-axis, y-axis, and z-axis), as colors, as textures, or any other manner of plotting values. The profiling plots are described in greater detail below in regard to FIG. 4.

In view of the foregoing and the following, the simulation system 120 of the present disclosure may provide advantages over conventional simulations systems and drilling methods. For example, the predictive algorithm may allow users (e.g., operators and engineers) to complete between about 10 times and about 30 times more simulations of a directional drilling operation utilizing the predictive algorithm in comparison to conventional simulation systems. Furthermore, the predictive algorithm may reduce required user time (e.g., operator and/or engineer time) by about 70% to about 90%. Moreover, more simulations will result in better earth-boring tool and drilling parameters selections, which will result in higher quality boreholes and better success rates of achieving well plans. Moreover, better earth-boring tool and drilling parameters may maximize ROP and optimize directional objectives.

Moreover, the predictive algorithm, unlike a cluster system 104, may be disposed (e.g., loaded) on a computer downhole. For instance, the predictive algorithm may be disposed on a controller of a downhole rotary steerable system ("RSS") and could be utilized to run simulations based on real-time formation and drilling operation data. For example, the controller of the downhole RSS may be provided with real-time data acquired via sensors 140 and/or acquired at a surface of the borehole. Furthermore, based on the acquired real-time data, the controller of the downhole RSS can run simulations based on the real-time data and can adjust drilling parameters and steer the earth-boring tool automatically based on the newly run simulations. As a result, the predictive algorithm can be used to adjust drilling parameters as conditions change downhole. Accordingly, by disposing the predictive algorithm on a downhole RSS of an earth-boring tool, the earth-boring tool may be more autonomous relative to conventional earth-boring tools. In other embodiments, the predictive algorithm can be disposed on a controller anywhere within a drilling assembly 122 (e.g., within a drill string, a drill bit, a blade, a cutting element, etc.). For example, the predictive algorithm can be disposed on a controller at any of the sensor and circuit locations described in in U.S. Pat. No. 8,100,196, to Pastusek et al., filed Feb. 6, 2009, U.S. Pat. No. 7,849,934, to Pastusek et al., filed Feb. 16, 2007, and U.S. Pat. No. 7,604,072, to Pastusek et al., filed Jun. 7, 2005.

Additionally, as described briefly above, the simulation system 120 of the present disclosure is advantageous over conventional simulation systems because the predictive algorithm of the simulation system 120 enables user 110 (e.g., operators) to input parameters not originally included within the DDAS simulations performed by the cluster system 104 without having to re-run all the simulations. As a non-limiting example, the DDAS simulations may have included earth-boring tool options having 3-inch and 5-inch gauges. However, with the predictive algorithm, results (i.e., output variables) of an earth-boring tool having a 4-inch gauge can be determined without running any new DDAS simulations.

Furthermore, because the simulation system 120 of the present disclosure provides a predictive algorithm that is flexible to new input parameters while still providing accurate simulations of directional drilling operations, the simulation system 120 provides improvements in the performance of a computer system. For example, because the simulation system 120 only requires the predictive algorithms and associated variables instead of requiring a plurality of full simulations for every calculation, the simulation system 120 reduces required processing power, memory, etc. Therefore, the simulation system 120 reduces required processing power, memory, and communication resources needed to facilitate simulation processes. Accordingly, the simulation system 120, ultimately, results in less data transfer and data bandwidth usage for a computer/communication system 100. In other words, the simulation system 120 results in less required processing power and communication bandwidth in comparison to conventional systems. As a result, the simulation system 120 of the present disclosure, in comparison to conventional systems, is a more appropriate system for mobile devices and use downhole where room is limited.

Figures 3A, 3B:
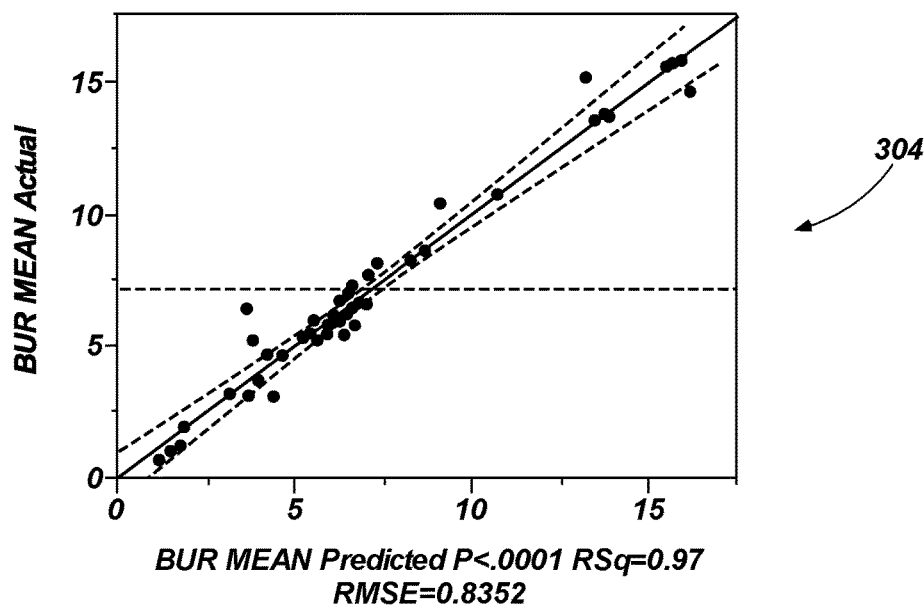
FIGS. 3A and 3B show predictive algorithm graphical user interfaces that the simulation system may display for viewing by a user according to one or more embodiments of the present disclosure.

FIGS. 3A and 3B show predictive algorithm GUIs 302, 304 that the simulation system 120 may display on the client device 102 for viewing by a user 110. As shown, the predictive algorithm GUIs 302, 304 may display estimated coefficients for variables (e.g., depth, UCS, gage length, gage undersize, ROP, INC, etc.) of the predictive algorithm. Furthermore, the predictive algorithm GUIs 302, 304 may include one or more graphs showing actual variable values versus predicted variable values.

Figure 4:
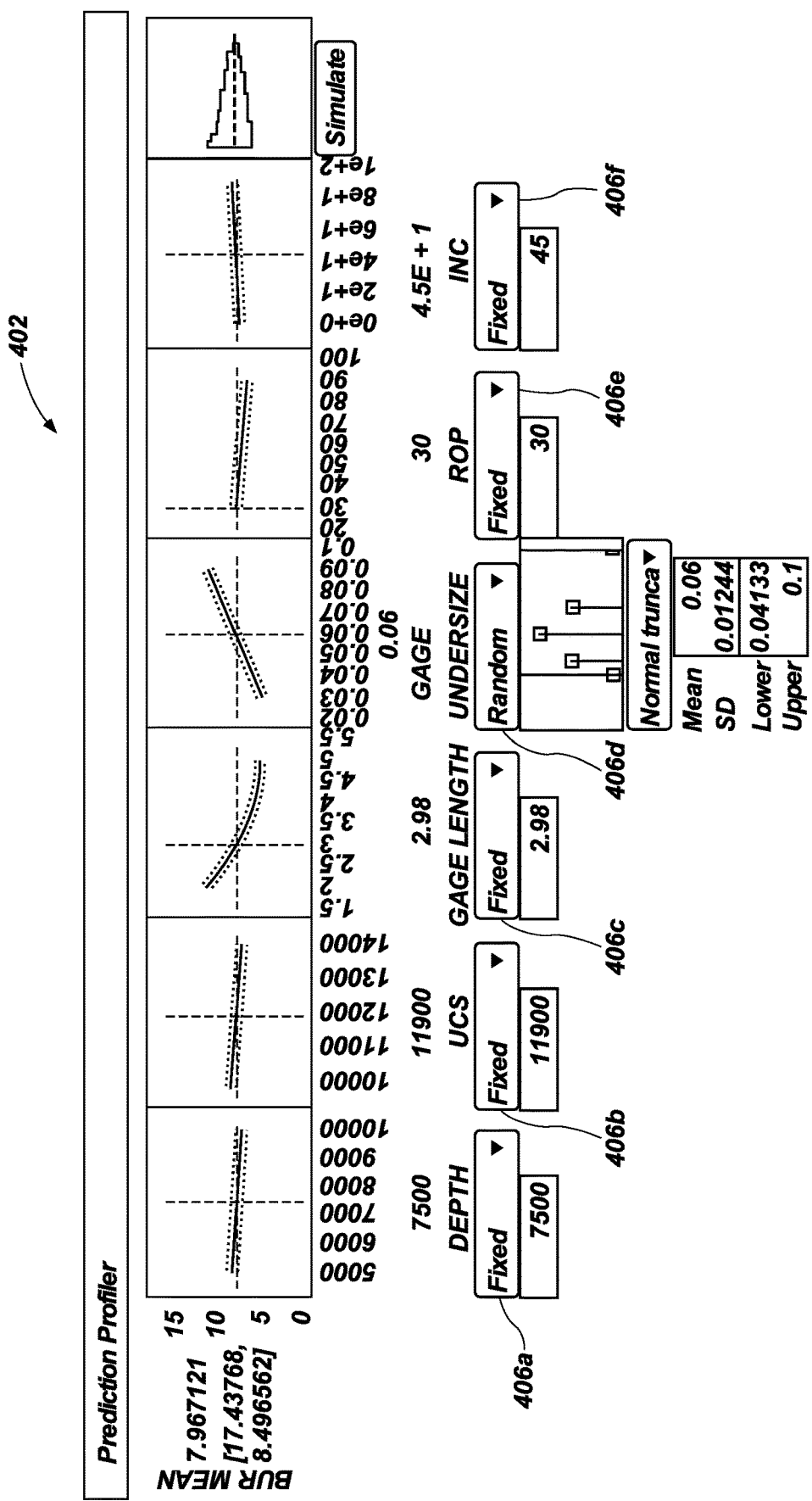
FIG. 4 shows an example profiling plot that can be generated and displayed by the simulation system according to one or more embodiments of the present disclosure.

FIG. 4 shows an example profiling plot 402 that can be generated and displayed by the simulation system 120. As shown, the profiling plot 402 may include at least one output variable (e.g., BUR) plotted against a plurality of input variables (e.g., depth, UCS, gage length, ROP, inclination, etc.). Furthermore, each of the plurality of input variables may have one or more selectable elements 406a-406f that can be utilized to adjust values of the input variables. As a result, the selectable elements 406a-406f may allow users (e.g., operators) to manipulate the slider values of the sliders (e.g., values of the input variables) and to visualize the effects of changing the input variables on the output variables.

Figure 5:
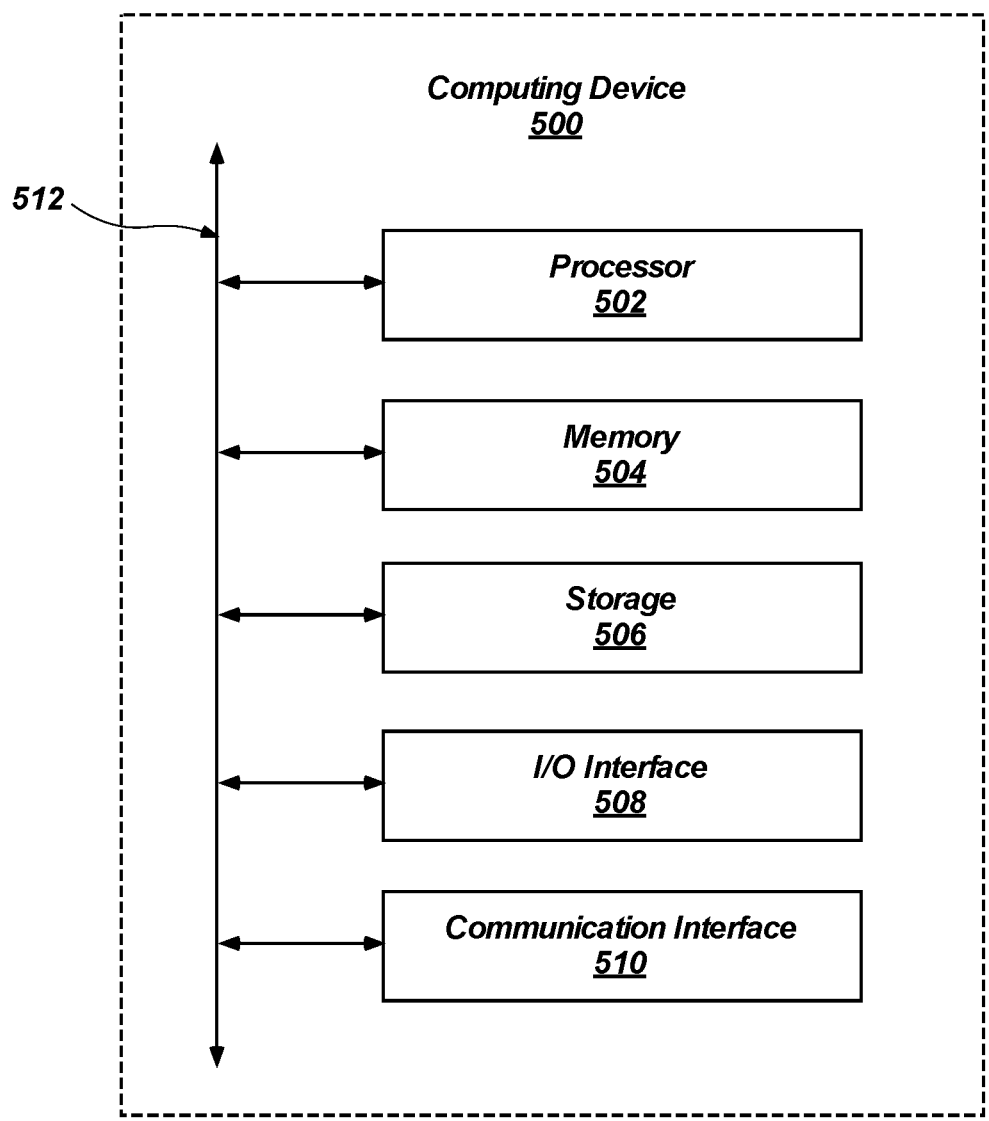
FIG. 5 is a block diagram of a surface control unit and/or a client device according to one or more embodiments of the present disclosure.

FIG. 5 is a block diagram of a surface control unit 108 and/or a client device 102 (see FIG. 1) according to one or more embodiments of the present disclosure. One will appreciate that one or more computing devices 500 may implement the surface control unit 108 and/or a client device 102. The surface control unit 108 and/or a client device 102 can comprise a processor 502, a memory 504, a storage device 506, an I/O interface 508, and a communication interface 510, which may be communicatively coupled by way of a communication infrastructure 512. While an exemplary computing device is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In one or more embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In one or more embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage device 506.

The memory 504 may be used for storing data, metadata, and programs for execution by the processor(s). The memory 504 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, storage device 506 can comprise a non-transitory storage medium described above. The storage device 506 may include a hard disk drive (HDD), a floppy disk drive, Flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In one or more embodiments, the storage device 506 is non-volatile, solid-state memory. In other embodiments, the storage device 506 includes Read-Only Memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The I/O interface 508 allows a user to provide input to, receive output from, and otherwise transfer data to and receive data from computing device 500. The I/O interface 508 may include a mouse, a keypad or a keyboard, a touchscreen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH® WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND® interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The disclosure further includes the following Embodiments.

Embodiment 1: A method, comprising: receiving a first plurality of inputs including at least one drilling parameter, at least one lithology parameter, and at least one earth-boring tool option; providing the first plurality of inputs to a cluster system; receiving simulation data from the cluster system derived from a plurality of simulations of drilling operations utilizing the first plurality of inputs; analyzing the simulation data to generate a predictive algorithm for simulating drilling operations; receiving a well plan including data related to a planned trajectory of a borehole; and utilizing the predictive algorithm to select a suitable earth-boring tool and suitable drilling parameters to achieve the planned trajectory of a borehole.

Embodiment 2: The method of Embodiment 1, wherein the plurality of simulations of drilling operations comprises thousands of simulations.

Embodiment 3: The method of Embodiments 1 and 2, wherein receiving simulation data from the cluster system derived from a plurality of simulations of drilling operations utilizing the first plurality of inputs comprises receiving simulation data from the cluster system derived from a plurality of direction drill ahead simulations utilizing the first plurality of inputs.

Embodiment 4: The method of Embodiments 1 through 3, further comprising analyzing the simulation data to determine averages, maximums, minimums, coefficients of variation, quartiles, and standard deviations of output variables of the simulation data.

Embodiment 5: The method of Embodiments 1 through 4, wherein the simulation data comprises data related to at least one of build-up-rates, turn rates, DLS, rates of penetration, lateral rates of penetration, unconfined compressive strengths, confined compressive strengths, contact forces, weight-on-bit, or rib forces.

Embodiment 6: The method of Embodiments 1 through 5, wherein analyzing the simulation data comprises analyzing the simulation data via a machine learning technique.

Embodiment 7: The method of Embodiment 6, wherein the machine learning technique comprises a linear regression analysis.

Embodiment 8: The method of Embodiment 6, wherein the machine learning technique is selected from a list consisting of a multivariate interpolation analysis, regression tree analysis, boosted tree analysis, k-nearest neighbor analysis, or a neural network.

Embodiment 9: The method of Embodiments 1 through 6, further comprising utilizing the predictive algorithm to generate simulations of a drilling operation using a second plurality of inputs that are at least partially different from the first plurality of inputs and without performing any additional simulations with the cluster system.

Embodiment 10: The method of Embodiments 1 through 6, wherein utilizing the predictive algorithm to select a suitable earth-boring tool and suitable drilling parameters to achieve the planned trajectory of a borehole comprises utilizing the predictive algorithm to select a best earth-boring tool and best drilling parameters to achieve the planned trajectory of the borehole.

Embodiment 11: A simulation system, comprising: at least one processor; and at least one non-transitory computer-readable storage medium storing instructions thereon that, when executed by the at least one processor, cause the system to: receive a first plurality of inputs including at least one drilling parameter, at least one lithology parameter, and at least one earth-boring tool option; provide the first plurality of inputs to a cluster system; receive simulation data from the cluster system derived from a plurality of simulations of drilling operations utilizing the first plurality of inputs; analyze the simulation data to generate a predictive algorithm for simulating drilling operations; receive a well plan including data related to a planned trajectory of a borehole; and utilize the predictive algorithm to select a suitable earth-boring tool and suitable drilling parameters to achieve the planned trajectory of a borehole.

Embodiment 12: The simulation system of Embodiment 11, wherein receiving simulation data from the cluster system derived from a plurality of simulations of drilling operations utilizing the first plurality of inputs comprises receiving simulation data from the cluster system derived from a plurality of direction drill ahead simulations utilizing the first plurality of inputs.

Embodiment 13: The simulation system of Embodiments 11 and 12, wherein the simulation data comprises data related to at least one of build-up-rates, turn rates, DLS, rates of penetration, lateral rates of penetration, unconfined compressive strengths, confined compressive strengths, contact forces, weight-on-bit, or rib forces.

Embodiment 14: The simulation system of Embodiments 11 through 13, wherein analyzing the simulation data comprises analyzing the simulation data via a machine learning technique.

Embodiment 15: The simulation system of Embodiment 14, further comprising instructions that, when executed by the processor, cause the system to utilize the machine learning technique and predictive algorithm on a downhole computer to automatically steer a drilling assembly to at least substantially follow a well path.

Embodiment 16: The simulation system of Embodiment 14, further comprising instructions that, when executed by the processor, cause the system to: automatically generate reports that display results of the plurality of simulations of drilling operations, results of analyzing the simulation data via the machine learning technique; and provide recommendations of suitable earth-boring tools, suitable drilling parameters, and suitable bottom-hole assemblies for at least substantially achieving the planned trajectory of a borehole.

Embodiment 17: A non-transitory computer-readable medium storing instructions thereon that, when executed by at least one processor, cause the at least one processor to perform steps comprising: receive a first plurality of inputs including at least one drilling parameter, at least one lithology parameter, and at least one earth-boring tool option; provide the first plurality of inputs to a cluster system; receive simulation data from the cluster system derived from a plurality of simulations of drilling operations utilizing the first plurality of inputs; analyze the simulation data to generate a predictive algorithm for simulating drilling operations; receive a well plan including data related to a planned trajectory of a borehole; utilize the predictive algorithm to select a suitable earth-boring tool and suitable drilling parameters to achieve the planned trajectory of a borehole; and utilizing the predictive algorithm to generate simulations of a drilling operation using a second plurality of inputs that are at least partially different from the first plurality of inputs and without performing any additional simulations with the cluster system.

Embodiment 18: The non-transitory computer-readable medium of Embodiment 17, wherein receiving simulation data from the cluster system derived from a plurality of simulations of drilling operations utilizing the first plurality of inputs comprises receiving simulation data from the cluster system derived from a plurality of direction drill ahead simulations utilizing the first plurality of inputs.

Embodiment 19: The earth-boring tool monitoring system of Embodiments 17 and 18, wherein the simulation data comprises data related to at least one of build-up-rates, turn rates, DLS, rates of penetration, lateral rates of penetration, unconfined compressive strengths, confined compressive strengths, contact forces, weight-on-bit, or rib forces.

Embodiment 20: The non-transitory computer-readable medium of Embodiments 17 through 19, wherein analyzing the simulation data comprises analyzing the simulation data via a machine learning technique.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method, comprising:
receiving a first plurality of inputs including at least one drilling parameter, at least one lithology parameter, and at least one earth-boring tool option;
providing the first plurality of inputs to a cluster system;
receiving simulation data outputs from the cluster system derived from a plurality of simulations of drilling operations utilizing the first plurality of inputs;
analyzing the simulation data outputs;
generating a predictive algorithm for simulating drilling operations based at least on relationships between the simulation data outputs;
receiving a well plan including data related to a planned trajectory of a borehole, wherein the data related to the planned trajectory of the borehole comprises same types of data to the first plurality of inputs; and
utilizing the predictive algorithm to select a suitable earth-boring tool and suitable drilling parameters for achieving the planned trajectory of a borehole.

2. The method of claim 1, further comprising drilling a borehole using the suitable earth-boring tool and suitable drilling parameters.

3. The method of claim 1, wherein receiving simulation data outputs from the cluster system derived from a plurality of simulations of drilling operations utilizing the first plurality of inputs comprises receiving simulation data outputs from the cluster system derived from a plurality of direction drill ahead simulations utilizing the first plurality of inputs.

4. The method of claim 1, further comprising analyzing the simulation data outputs to determine averages, maximums, minimums, coefficients of variation, quartiles, and standard deviations of the simulation data outputs.

5. The method of claim 1, wherein the simulation data outputs comprise data related to at least one of build-up-rates, turn rates, DLS, rates of penetration, lateral rates of penetration, unconfined compressive strengths, confined compressive strengths, contact forces, weight-on-bit, or rib forces.

6. The method of claim 1, wherein analyzing the simulation data comprises analyzing the simulation data via a machine learning technique.

7. The method of claim 6, wherein the machine learning technique comprises a linear regression analysis.

8. The method of claim 6, wherein the machine learning technique is selected from a list consisting of a multivariate interpolation analysis, regression tree analysis, boosted tree analysis, k-nearest neighbor analysis, or a neural network.

9. The method of claim 1, further comprising utilizing the predictive algorithm to generate simulations of a drilling operation using a second plurality of inputs that are different from the first plurality of inputs and without performing any additional simulations with the cluster system.

10. The method of claim 1, wherein utilizing the predictive algorithm to select a suitable earth-boring tool and suitable drilling parameters to achieve the planned trajectory of a borehole comprises utilizing the predictive algorithm to select a best earth-boring tool and best drilling parameters to achieve the planned trajectory of the borehole.

11. A simulation system, comprising:
at least one processor; and
at least one non-transitory computer-readable storage medium storing instructions thereon that, when executed by the at least one processor, cause the system to:
receive a first plurality of inputs including at least one drilling parameter, at least one lithology parameter, and at least one earth-boring tool option;
provide the first plurality of inputs to a cluster system;

receive simulation data outputs from the cluster system derived from a plurality of simulations of drilling operations utilizing the first plurality of inputs;

analyze the simulation data outputs;

generate a predictive algorithm for simulating drilling operations based at least on relationships between the simulation data outputs;

receive a well plan including data related to a planned trajectory of a borehole; and utilize the predictive algorithm to select a suitable earth-boring tool and suitable drilling parameters for achieving the planned trajectory of a borehole.

12. The simulation system of claim 11, wherein the simulation data outputs comprise data related to at least one of build-up-rates, turn rates, DLS, rates of penetration, lateral rates of penetration, unconfined compressive strengths, confined compressive strengths, contact forces, weight-on-bit, or rib forces.

13. The simulation system of claim 11, wherein analyzing the simulation data comprises analyzing the simulation data via a machine learning technique.

14. The simulation system of claim 13, further comprising instructions that, when executed by the processor, cause the system to utilize the machine learning technique and predictive algorithm on a downhole computer to automatically steer a drilling assembly to follow a well path.

15. The simulation system of claim 13, further comprising instructions that, when executed by the processor, cause the system to:

automatically generate reports that display results of the plurality of simulations of drilling operations, results of analyzing the simulation data via the machine learning technique; and provide recommendations of suitable earth-boring tools, suitable drilling parameters, and suitable bottom-hole-assemblies for achieving the planned trajectory of a borehole.

16. A method of drilling a borehole using the suitable earth-boring tool and suitable drilling parameters selected by the simulation system of claim 11.

17. A non-transitory computer-readable medium storing instructions thereon that, when executed by at least one processor, cause the at least one processor to perform steps comprising:

receive a first plurality of inputs including at least one drilling parameter, at least one lithology parameter, and at least one earth-boring tool option;

provide the first plurality of inputs to a cluster system;

receive simulation data from the cluster system derived from a plurality of simulations of drilling operations utilizing the first plurality of inputs;

analyze the simulation data to generate a predictive algorithm for simulating drilling operations;

receive a well plan including data related to a planned trajectory of a borehole;

utilize the predictive algorithm to select a suitable earth-boring tool and suitable drilling parameters for achieving the planned trajectory of a borehole; and utilizing the predictive algorithm to generate simulations of a drilling operation using a second plurality of inputs that are different from the first plurality of inputs and without performing any additional simulations with the cluster system.

18. The non-transitory computer-readable medium of claim 17, wherein receiving simulation data from the cluster system derived from a plurality of simulations of drilling operations utilizing the first plurality of inputs comprises receiving simulation data from the cluster system derived from a plurality of direction drill ahead simulations utilizing the first plurality of inputs.

19. The non-transitory computer-readable medium of claim 17, wherein the simulation data comprises data related to at least one of build-up-rates, turn rates, DLS, rates of penetration, lateral rates of penetration, unconfined compressive strengths, confined compressive strengths, contact forces, weight-on-bit, or rib forces.

20. The non-transitory computer-readable medium of claim 17, wherein analyzing the simulation data comprises analyzing the simulation data via a machine learning technique.

* * * * *